(12) United States Patent
Wang et al.

(10) Patent No.: US 9,390,284 B1
(45) Date of Patent: Jul. 12, 2016

(54) METHOD FOR SECURE AND PRIVATE COMPUTER FILE

(71) Applicants: Ray Wang, McLean, VA (US); Borwyn Anne Wang, McLean, VA (US); Andrew Borwei Wang, McLean, VA (US)

(72) Inventors: Ray Wang, McLean, VA (US); Borwyn Anne Wang, McLean, VA (US); Andrew Borwei Wang, McLean, VA (US)

( * ) Notice: Subject to any disclaimer, the term of this patent is extended or adjusted under 35 U.S.C. 154(b) by 0 days.

(21) Appl. No.: 14/678,154

(22) Filed: Apr. 3, 2015

(51) Int. Cl.
*G06F 21/62* (2013.01)

(52) U.S. Cl.
CPC .................. *G06F 21/6218* (2013.01)

(58) Field of Classification Search
CPC .............................. G06F 21/62; G06F 21/6218
See application file for complete search history.

(56) References Cited

U.S. PATENT DOCUMENTS

| | | | |
|---|---|---|---|
| 7,586,888 B2 | 9/2009 | Wang | |
| 7,630,736 B2 | 12/2009 | Wang | |
| 7,788,485 B2 | 8/2010 | Connell | |
| 7,801,058 B2 | 9/2010 | Wang | |
| 7,937,484 B2 | 5/2011 | Julia et al. | |
| 8,195,744 B2 | 6/2012 | Julia et al. | |
| 8,195,765 B2 | 6/2012 | Julia et al. | |
| 8,305,935 B2 | 11/2012 | Wang | |
| 8,305,936 B2 | 11/2012 | Wang | |
| 8,353,052 B2 | 1/2013 | Larsson et al. | |
| 8,411,590 B2 | 4/2013 | Wang | |
| 8,427,979 B1 | 4/2013 | Wang | |
| 8,463,765 B2 | 6/2013 | Lesavich | |
| 8,738,693 B2 | 5/2014 | Julia et al. | |
| 8,738,730 B2 | 5/2014 | Julia et al. | |
| 8,787,164 B2 | 7/2014 | Julia et al. | |
| 8,819,140 B2 | 8/2014 | Julia et al. | |
| 8,965,460 B1 | 2/2015 | Rao et al. | |
| 8,973,072 B2 | 3/2015 | Julia et al. | |
| 9,037,564 B2 | 5/2015 | Lesavich et al. | |
| 9,137,250 B2 | 9/2015 | Lesavich et al. | |
| 2003/0126215 A1* | 7/2003 | Udell ..................... G06F 21/10 709/206 |
| 2003/0236821 A1 | 12/2003 | Jiau | |
| 2004/0157649 A1 | 8/2004 | Jannard et al. | |
| 2005/0033958 A1 | 2/2005 | Connell | |
| 2006/0026271 A1 | 2/2006 | Julia et al. | |
| 2006/0047843 A1 | 3/2006 | Julia et al. | |
| 2006/0167985 A1 | 7/2006 | Albanese et al. | |
| 2006/0182076 A1 | 8/2006 | Wang | |
| 2007/0090996 A1 | 4/2007 | Wang | |
| 2007/0286378 A1 | 12/2007 | Brown et al. | |
| 2008/0025330 A1 | 1/2008 | Wang | |
| 2008/0059188 A1 | 3/2008 | Konopka et al. | |
| 2008/0123683 A1 | 5/2008 | Cheng et al. | |
| 2008/0300917 A1 | 12/2008 | Ryan et al. | |
| 2009/0070884 A1 | 3/2009 | Wu et al. | |
| 2009/0189739 A1 | 7/2009 | Wang | |
| 2010/0324956 A1 | 12/2010 | Lopez et al. | |
| 2011/0019587 A1 | 1/2011 | Wang | |
| 2011/0149802 A1 | 6/2011 | Fok Ah Chuen et al. | |
| 2011/0208710 A1 | 8/2011 | Lesavich | |
| 2011/0210816 A1 | 9/2011 | Wang | |
| 2011/0235627 A1 | 9/2011 | Wang | |
| 2011/0302620 A1 | 12/2011 | Karaoguz et al. | |

(Continued)

*Primary Examiner* — Chau Le
*Assistant Examiner* — Ghodrat Jamshidi
(74) *Attorney, Agent, or Firm* — Lesavich High-Tech Law Group, S.C.

(57) ABSTRACT

A method to guard the integrity of information after transferred over Internet and stored on to other computing devices. The method takes a target computer file that requires the protection then adds and/or binds security and privacy protection parameters through a file transfer process which converts the computer file to a self-manageable secured private executable file.

18 Claims, 6 Drawing Sheets

(56) References Cited

U.S. PATENT DOCUMENTS

| | | |
|---|---|---|
| 2012/0278622 A1 | 11/2012 | Lesavich et al. |
| 2013/0094538 A1 | 4/2013 | Wang |
| 2014/0189792 A1 | 7/2014 | Lesavich et al. |
| 2014/0334501 A1* | 11/2014 | Sharma .............. H04L 69/324 370/465 |
| 2015/0116465 A1 | 4/2015 | Wang et al. |
| 2015/0263886 A1 | 9/2015 | Wang et al. |
| 2015/0379301 A1 | 12/2015 | Lesavich et al. |

* cited by examiner

METHOD FOR SECURE AND PRIVATE COMPUTER FILE

FIELD OF THE INVENTION

The present invention relates to computer file and, more particularly, to a method and system for a self-manageable and secured private computer file

BACKGROUND OF THE INVENTION

Ever since Internet became convenient for file transfer and/or file sharing, there has been a need to guard the integrity of information, such as document, text, photo, picture, video, chat, etc., from tampering or unauthorized use. Much Internet security software, such as Norton Internet Security by Symantec and McFee Security by McFee Inc., have been offering security functions to guard computers from virus attack, malware, identify theft, phishing, spam, spyware, and firewall breaks.

There are computer software saving a document in read-only format prevents readers from editing its content. For example, Adobe Acrobat has security settings to configure PDF files so that anyone can read them but only certain individuals who know the password can make edits.

There are computer software and service such as Dropbox, Google Drive, Apple's iCloud, Citrix's ShareFile provide file sharing and data storage with password-protected cloud storage to store and exchange large files.

The two biggest concerns about cloud storage for file sharing are reliability and security. Users are not likely to entrust their data to another company without a guarantee that they will be able to access their information whenever they want and no one else will be able to get at it.

One problem associate with the read-only document is that although readers cannot make any changes to the text, margins or graphics, they can print these files and distribute them freely. Giving password to general public is simply impractical.

The other problem with today's Internet security software is that they protect files stored in computers but offer no extended protection once the file left the computer, off to Internet, and transferred on to other computers. In other words, the information in the computer file once posted on to a remote web site and/or cloud computing servers its access and use by others is unknown and also a concern to the sender.

Another problem is that users do not know whether the posted information is stayed at the intended location or is forwarded to or copied by unknown 3rd party for unauthorized use.

Thus, it is desirable to solve some of the problems associated computer files with a rule-based privacy protection mechanism It would be advantageous to provide a secure and private computer file that is self-manageable upon a set of user defined access rules It would also be advantageous to provide a secure and private computer file that has life span or life cycle perspective It would further be advantageous to provide a secure and private computer file that can lock, close, delete, and track itself when unauthorized use is attempted to it.

SUMMARY OF THE INVENTION

In accordance with the present invention, there is provided a method to guard the integrity of information after it transferred over Internet and stored on to other computing devices. The method takes a computer file, adds and/or binds security and privacy protection parameters through a compilation process which then converts the computer file to a self-manageable and executable file.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
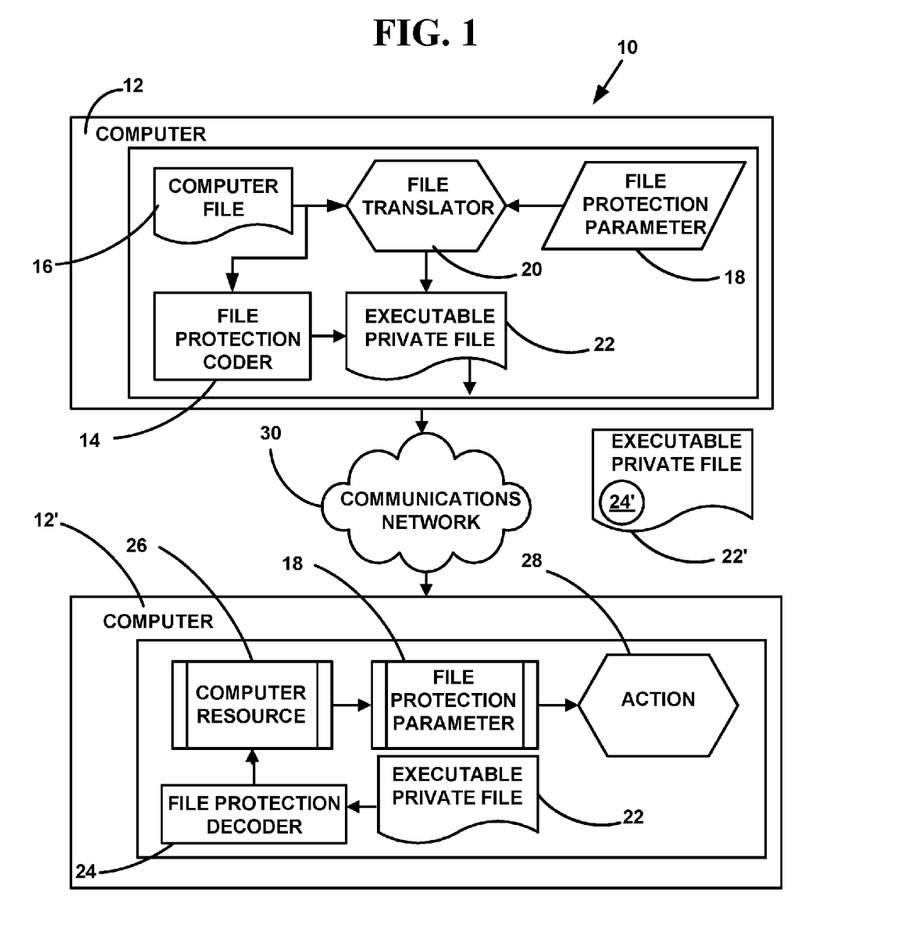
FIG. 1 is a block diagram illustrating an exemplary self manageable computer file protection system.

FIG. 1 is a block diagram illustrating an exemplary self-manageable computer file protection system 10 in accordance with the invention. The exemplary self-manageable computer file protection system 10 includes, but is not limited to, one or more network devices 12, 12' (only two computers are illustrated), coder 14, decoder 24, and communication network 30.

The one or more network devices 12, each with one or more processors and each with a non-transitory computer readable medium, include, but are not limited to, a computer, a notebook, a netbook, a pad, multimedia capable desktop and laptop computers, tablet computers, facsimile machines, mobile phones, non-mobile phones with and/or without displays, three-dimensional (3D) printer, robots, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV), satellite television (SATV) and Internet television set-top boxes, digital televisions including high definition television (HDTV), three-dimensional (3DTV) televisions, wearable devices for medical or non-medical usage, treadmills, exercise bicycles, a remote control, a disposable network device, a portable network device, and other types of network devices 12. Each network device has a unique identifier and/or name for identification.

The coder 14 is a software function resides in network devices 12 such as a computer for generating a private file 22 to protect the computer file 16. A coder 14 can be written in any computer programming language, but is not limited to, C/C++, Java, or other low-level or high-level programming languages.

A coder 14 written in a computer programming language in any collection of computer instructions is known as source code.

The source code is transformed through a compiler which is a computer program (or set of programs) into another computer language (the target language, often having a binary form known as object code). The most common reason for converting a source code is to create an executable program.

A compiler is primarily used for programs that translate source code from a high-level programming language to a lower level language (e.g., assembly language or machine code). "compiler" is known as a cross-compiler if the compiled program can run on a computer whose CPU or operating system is different from the one on which the compiler runs. More generally, compilers are a specific type of translators.

C is a general-purpose, imperative computer programming language. It supports structured programming, lexical variable scope and recursion, while a static type system prevents many unintended operations. By design, C provides constructs that map efficiently to typical machine instructions, and therefore it has found lasting use in applications that had formerly been coded in assembly language, including operating systems, as well as various application software for computers ranging from supercomputers to embedded systems.

C++ is a general-purpose programming language. It has imperative, object-oriented and generic programming features, while also providing the facilities for low-level memory manipulation. It is designed with a bias toward system programming (e.g., for use in embedded systems or operating system kernels), with performance, efficiency and flexibility of use as its design requirements. C++ has also been found useful in many other contexts, including desktop applications, servers (e.g. e-commerce, web search or SQL servers), performance-critical applications (e.g. telephone switches or space probes), and entertainment software. C++ is a compiled language, with implementations of it available on many platforms and provided by various organizations, including the FSF, LLVM, Microsoft and Intel.

Java is a general-purpose computer programming language that is concurrent, class-based, object-oriented, and specifically designed to have as few implementation dependencies as possible. It is intended to let application developers "write once, run anywhere" (WORA), meaning that compiled Java code can run on all platforms that support Java without the need for recompilation. Java applications are typically compiled to bytecode that can run on any Java virtual machine (JVM) regardless of computer architecture. As of 2015, Java is one of the most popular programming languages in use, particularly for client-server web applications, with a reported 9 million developers. Java was originally developed by James Gosling at Sun Microsystems (which has since been acquired by Oracle Corporation) and released in 1995 as a core component of Sun Microsystems' Java platform. The language derives much of its syntax from C and C++, but it has fewer low-level facilities than either of them.

A low-level programming language is a programming language that provides little or no abstraction from a computer's instruction set architecture. Generally this refers to either machine code or assembly language. The word "low" refers to the small or nonexistent amount of abstraction between the language and machine language; because of this, low-level languages are sometimes described as being "close to the hardware". Low-level languages can be converted to machine code without using a compiler or interpreter, and the resulting code runs directly on the processor. A program written in a low-level language can be made to run very quickly, and with a very small memory footprint; an equivalent program in a high-level language will be more heavyweight. Low-level languages are simple, but are considered difficult to use, due to the numerous technical details which must be remembered.

By comparison, a high-level programming language, such as COBOL and FORTRAN, with strong abstraction from the details of the computer and isolates the execution semantics of computer architecture from the specification of the program, which simplifies development.

The coder 14 when executed by a computer it prompts the user to configure a set of file protection parameter 18. Upon the completion of the configuration the coder 14 then prompt the user for the location of a target computer file 16 that requires the protection. The coder 14 validates the location and the type of the file and then binds the file protection parameter 18 with the computer file 16 through the file translator 20 to produce a self-manageable and executable private file 22. The original computer file 16 is attached and/or encapsulated within the private file 22. The file protection parameter 18 sets the conditions and actions for the management of the computer file 16.

The computer file 16 is a resource of information that requires the protection. The computer file 16 may be any of the following file type, but are not limited to: Text files such as doc, rtf, docx, or txt, Portable Document Format (PDF), Joint Photographic Expert Group (JPEG, GIF), Power Point (PPT), Markup languages such as HTML, XML, etc., A text file is one kind of computer file 16 that is structured as a sequence of lines of electronic text. A text file exists within a computer file 16 system. The end of a text file is often denoted by placing one or more special characters, known as an end-of-file marker, after the last line in a text file. However, on some popular operating systems such as Windows or Linux, text files do not contain any special EOF character. Text files can contain plain text, but they are not limited to such.

Portable Document Format (PDF) is a file format used to present documents in a manner independent of application software, hardware, and operating systems. Each PDF file contains a complete description of a fixed-layout flat document, including the text, fonts, graphics, and other information needed to display it. In 1991, The term "JPEG" is an acronym for the Joint Photographic Experts Group, which created the standard. In computing, JPEG (seen most often with the .jpg or .jpeg filename extension) is a commonly used method of lossy compression for digital images, particularly for those images produced by digital photography. The degree of compression can be adjusted, allowing a selectable tradeoff between storage size and image quality. JPEG typically achieves 10:1 compression with little perceptible loss in image quality.

The Graphics Interchange Format (better known by its acronym GIF is a bitmap image format that was introduced by CompuServe in 1987 and has since come into widespread usage on the World Wide Web due to its wide support and portability. The format supports up to 8 bits per pixel for each image, allowing a single image to reference its own palette of up to 256 different colors chosen from the 24-bit RGB color space. It also supports animations and allows a separate palette of up to 256 colors for each frame. These palette limitations make the GIF format less suitable for reproducing color photographs and other images with continuous color, but it is well-suited for simpler images such as graphics or logos with solid areas of color. GIF images are compressed using the Lempel-Ziv-Welch (LZW) lossless data compression technique to reduce the file size without degrading the visual quality.

PowerPoint is a slide show presentation program developed by Microsoft. It was officially launched on May 22, 1990, as a part of the Microsoft Office suite.

A markup language is a modern system for annotating a document in a way that is syntactically distinguishable from the text. Examples include typesetting instructions such as those found in structural markers such as HTML, SGML, and XML, etc., tags. Markup instructs the software that displays the text to carry out appropriate actions, but is omitted from the version of the text that users see.

The file protection parameter 18 is a set of attributes used for file protection purpose. The parameter's attributes include, but are not limited to, file creation time, the file source location, the file intended location, the file life span. Each attribute has specific action 28 describing the operation rule when the condition of one or more attributes is mismatched.

In one embodiment, when one of the file protection parameter 18 condition, for example the file intended location, is changed or mismatched a tracking action could be activated to send back the new location of the computer file 16 to the original sender and/or the owner of the file. The reported tracking location could be one or more of the following, but is not limited to, an Internet address, a city name, a zip code, or a country code.

The file translator 20 is a process to bind and/or compile the target computer file 16 with the file protection parameter 18. The output of the file translator 20 process is an executable private file 22.

The computer file 16, which is encapsulated in the private file 22, is protected in such a way that it can only be read while the condition of the file protection parameter 18 is satisfied.

The computer file 16, which is encapsulated in the private file 22, is protected in such a way that it could be closed, locked, or deleted while the condition of the file protection parameter 18 is mismatched.

The computer file 16 when it is locked or closed it becomes inaccessible as long as the condition of the file protection parameter 18 remains mismatched.

The computer file 16 when it is deleted it means permanently locked

The protected computer file 16 in this present invention is a "read only" file and cannot be printed, copied, or edited during the execution of the private file 22.

The private file 22 in this present invention is an executable file or executable program, or sometimes simply an executable, causes a computer to perform indicated tasks according to encoded instructions. These instructions are traditionally machine code instructions for a physical CPU. However, in a more general sense, a file containing instructions (such as bytecode) for a software interpreter may also be considered executable; even a scripting language source file may therefore be considered executable in this sense.

CPU is Central Processing Unit, which is the electronic circuitry within a computer that carries out the instructions of a computer program by performing the basic arithmetic, logical, control and input/output (I/O) operations specified by the instructions. The term has been used in the computer industry at least since the early 1960s.

The speed that a CPU works at is measured in hertz, Hz. Modern processors often run so fast that gigahertz, GHz, is used instead. One gigahertz is one billion hertz. The CPU market for desktop (home) computers is largely controlled by two companies: Intel and Advanced Micro Devices (usually shortened to AMD). There are other CPU manufacturers like ARM, IBM, VIA, MCST, ELVEES, SRISA, NTC Module, and Sun Microsystems, but their CPUs usually have more specific uses (for example in mobile phones, smart phones, TV set-top box, cars, game consoles, or in the military).

Operating system (OS) is software that manages computer hardware and software resources and provides common services for computer programs. The operating system is an essential component of the system software in a computer system. Application programs usually require an operating system to function. Examples of popular modern operating systems include Android, BSD, iOS, Linux, OS X, QNX, and Microsoft Windows.

The executable private file 22 can run on any CPU or Operating System (OS) independent network devices 12.

The computer file 16 which encapsulated within the private file 22 can only be accessed through the decoder 24 function.

The decoder 24 is a software function, module, and/or a subroutine of the private file 22.

The network devices 12 are in communications with a communication network 30 which could be Internet, cellular network, cloud or a non-cloud computing network via one or more wired and/or wireless communications interfaces. The cloud computing network is also called a "cloud communication network" herein and the terms may be used interchangeably.

The Internet is a global system of interconnected computer networks that use the standard Internet protocol suite (TCP/IP) to link several billion devices worldwide. It is a network of networks that consists of millions of private, public, academic, business, and government networks of local to global scope, linked by a broad array of electronic, wireless, and optical networking technologies. The Internet carries an extensive range of information resources and services, such as the inter-linked hypertext documents and applications of the World Wide Web (WWW), the infrastructure to support email, and peer-to-peer networks for file sharing and telephony.

A cellular network or mobile network is a wireless network distributed over land areas called cells, each served by at least one fixed location transceiver, known as a cell site or base station. In a cellular network, each cell uses a different set of frequencies from neighboring cells, to avoid interference and provide guaranteed bandwidth within each cell.

The cloud communications network and non-cloud communications network includes, but is not limited to, communications over a wire connected to the target network devices, wireless communications, and other types of communications using one or more communications and/or networking protocols.

A "network topology" is an arrangement of a communication network 30 with the various elements (links, nodes, etc.). Essentially, it is the topological structure of the communications network 30 and may be depicted physically or logically, "Physical topology" is the placement of the various components of a network, including device location and cable installation. "Logical topology" illustrates how data flows within network, regardless of its physical design. Distances between nodes, physical interconnections, transmission rates, or signal types may differ between two networks, yet their topologies may be identical.

The "network topology" of a communication network 30 includes point-to-point, star, ring or circular, mesh, tree, hybrid, or daisy chain topologies. However, the present invention is not limited to these network topologies and other embodiments can be used to practice the invention.

The decoder 24 is a software function for managing the protected computer file 16 according to the setting of the file protection parameter 18 and associated action 28.

The decoder 24 is functionally equivalent to parsing or syntactic analysis which is the process of analyzing a string of symbols, either in natural language or in computer languages, conforming to the rules of a formal grammar.

The decoder 24 when executed on network devices 12 is first checking the accessibility of local computer resource 26 such as, but are not limited to, a clock, a storage medium, an input/output device, and a network device connecting to Internet. Once the decoder 24 confirms its accessibility on computer resource 26 it then reads the file protection parameter 18 and associate action 28 to manage the encapsulated computer file 16.

The decoder 24 module in the private file opens the "read only" encapsulated computer file 16 when all conditions of the file protection parameter 18 are satisfied.

The action 28 in this present invention is a set of rules and/or operations when the condition of one or more file protection parameter 18 is mismatched.

One or more action 28 includes, but is not limited to: "close file", "lock file", "delete file", "track and report" file new locations.

For example, the decoder 24 may lock the encapsulated computer file 16 from opening when the local computer resource 26 is not accessible.

The "close file" action in this present invention is to close the currently opened computer file 16 when the condition of one or more file protection parameter 18 is mismatched.

The "lock file" action in this present invention is to prevent the computer file 16 from opening, printing, coping, or transmitting over a network and/or Internet when the condition of one or more file protection parameter 18 is mismatched.

The "delete file" action in this present invention is to close and lock the computer file 16 permanently when the condition of one or more file protection parameter 18 is mismatched.

The "track and report" action in this present invention is to track and send the current location of the computer file 16 to the file owner and/or original sender when the condition of one or more file protection parameter 18 is mismatched. The location could be one or more of the following, but are not limited to, Internet address, city name, zip code, or country code.

Figure 2:
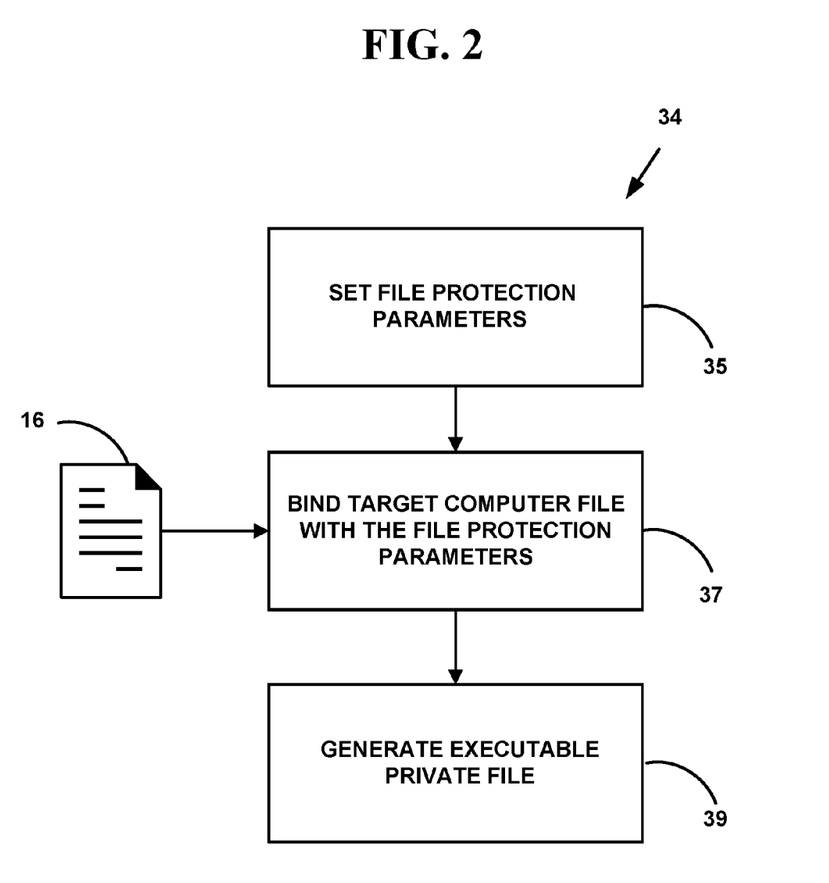
FIG. 2 is a flow diagram illustrating an exemplary method for generating an executable private file.

FIG. 2 is a flow diagram 34 illustrating an exemplary method for generating an executable private file with the steps executed in the coder 14 shown in FIG. 1. The coder 14 takes a computer file 16 that requires the protection as input, then sets up at step 35 the file protection parameter 18, and then binds at step 37 the computer file 16 and the file protection parameter 18 together to produce at step 39 an executable private file 22. One or more configurable attributes and associate actions are used to describe the rule of the file protections.

The file protection parameter 18 include one or more attributes, but are not limited to, file creation time, file source, intended file destination, file life span, etc., Each attribute has an action 28 instructing the decoder 24 on operation when the specific file protection parameter 18 is mismatched. One or more action 28 can be set, but are not limited to: close file, lock file, delete file, or track and report file new location.

Each action 28 field is coded by a numeric and can be represented in, but is not limited to, Decimal, Hexadecimal, Octal, or Binary string. For example, "file open" could be coded a numeric "1", Octal "001", or Binary "0000 0001" representation.

Figure 3:
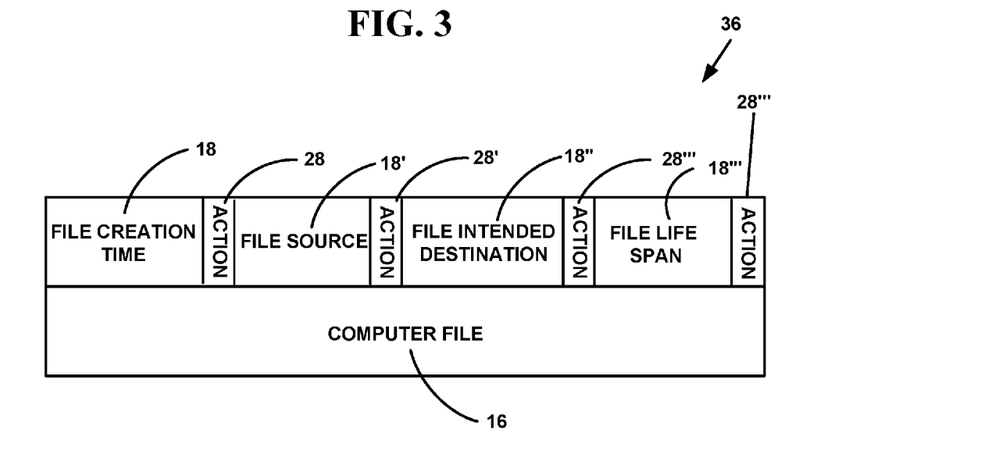
FIG. 3 is a block diagram illustrating an exemplary data structure of a private file.

FIG. 3 is a block diagram illustrating an exemplary data structure 36 of a private file 22. The private file 22 data structure 36 includes, but is not limited to, a header of the file protection parameters 18 and a computer file 16. One or more file protection parameters 18 include, but are not limited to, file creation time 18, file source location 18', file type, file intended location 18", and file life span 18'". Each parameter attribute has a specific action 28, 28', 28", 28"' describing the operations and/or rules when the setting of the file protection parameter 18 is violated.

The file creation time is a calendar date specifying the time when the private file 22 is created. A calendar date is a reference to a particular day represented within a calendar system. The calendar date allows the specific day to be identified. A particular day may be represented by a different date in another calendar as in the Gregorian calendar and the Julian calendar, which have been used simultaneously in different places. In most calendar systems, the date consists of three parts: the day of month, month, and the year.

In one embodiment of the invention, the file creation time is based on computer system time represents a computer system's notion of the passing of time. In this sense, time also includes the passing of days on the calendar.

The file source shown in FIG. 3 is the location of the network device, such as a computer, where the computer file resided. The network device is identified by, but is not limited to: an Internet Protocol (IP) address, a Media Access Control address (MAC address), device identification, an alphabetic name, city, zip code, country code, or a numeric expression.

An Internet Protocol address (IP address) is a numerical label assigned to each device (e.g., computer, printer) participating in a computer network that uses the Internet Protocol for communication. An IP address serves two principal functions: host or network interface identification and location addressing. Its role has been characterized as follows: "A name indicates what we seek. An address indicates where it is. A route indicates how to get there.

A media access control address (MAC address) is a unique identifier assigned to network interfaces for communications on the physical network segment. MAC addresses are used as a network address for most IEEE 802 network technologies, including Ethernet and Wireless Local Area Network (WLAN). MAC addresses are used in the media access control protocol sublayer of the OSI reference model. MAC addresses are most often assigned by the manufacturer of a network interface controller (NIC) and are stored in its hardware, such as the card's read-only memory or some other firmware mechanism. If assigned by the manufacturer, a MAC address usually encodes the manufacturer's registered identification number and may be referred to as the burned-in address (BIA). It may also be known as an Ethernet hardware address (EHA), hardware address or physical address. This can be contrasted to a programmed address, where the host device issues commands to the NIC to use an arbitrary address.

The device identification is used to identify the type of the device, such as, but is not limited to, a data storage device such as a USB FLASH memory stick and a secure digital (SD) card; a serial number or a name of the device.

The file intended location in FIG. 3 is a network device to where the computer file 16 is intended. The intended location is network device identification includes, but is not limited to: an Internet Protocol (IP) address, a Media Access Control address (MAC address), device identification, an alphabetic name, city, zip code, country code, or a numeric expression.

In one embodiment, the file life span in FIG. 3 is an end-of-life time of the computer file 16. When the file span or end-of-life is reached the decoder 24 will lock, close, or delete the encapsulated computer file 16.

In one embodiment, the private file 22 when executed it access and read the current value of the resident computer resource 26, such as the computer machine identifier, Internet protocol address, calendar time, to compare them with the values set for the file protection parameter 18. The computer file 16 that is bond in the private file 22 could be deleted or blocked from opening when the condition of one or more file protection parameter 18 is mismatched.

Figure 4:
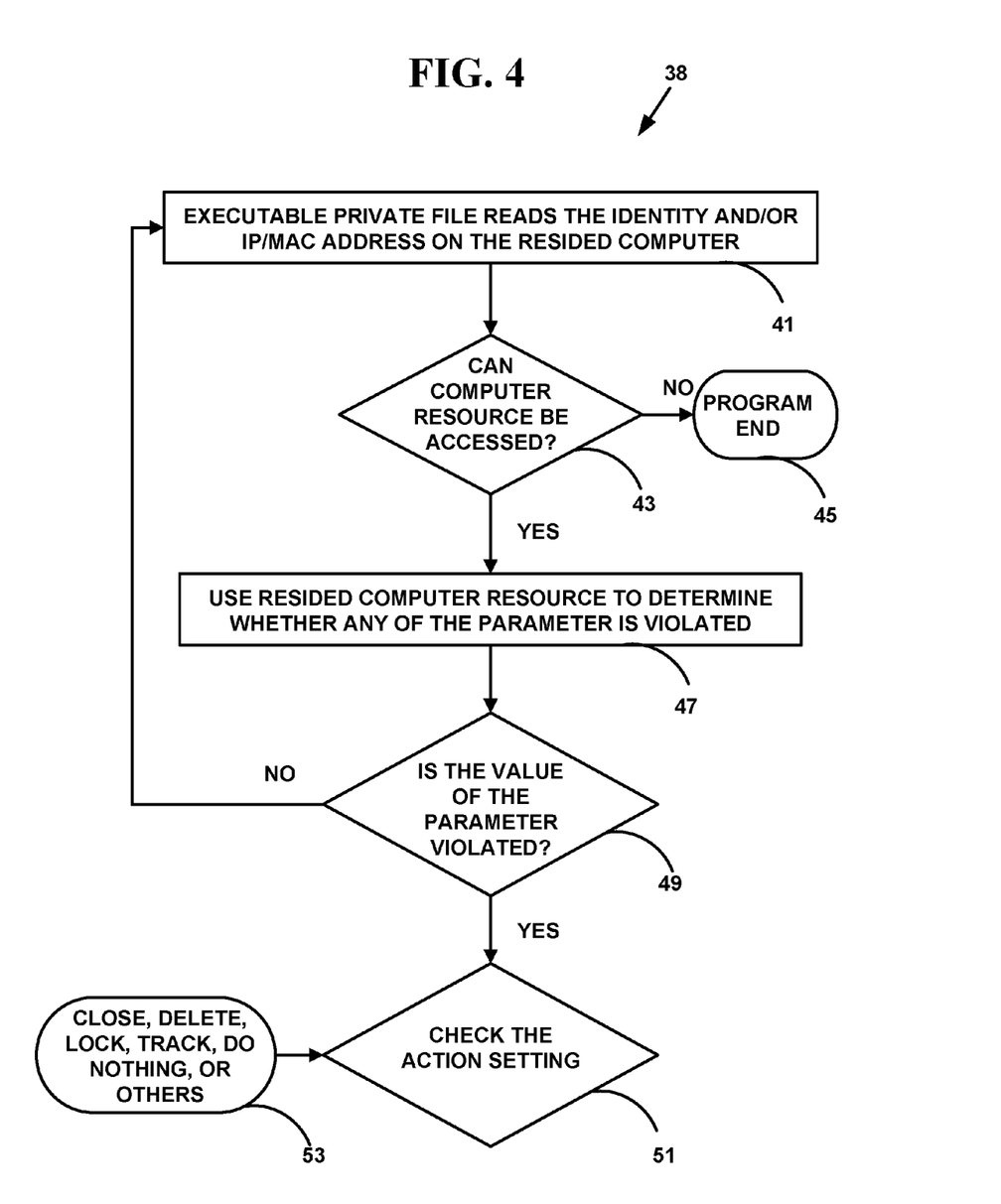
FIG. 4 is a flow diagram illustrating an exemplary method for the decoder.

FIG. 4 is a flow diagram 38 illustrating an exemplary method for the decoder 24. The exemplary decoder 24' (FIG. 1) is a software module in the private file 22' (FIG. 1) which resides on network devices 12, such as a computer, to manage the access of the computer file 16 according to the setting of the file protection parameter 18.

In one embodiment, the decoder 24 module protects the encapsulating computer file 16 from accessing (copy or open) by terminating the execution of the private file 22 when the resource of the network devices 12 is inaccessible at steps 43 and 45 of FIG. 4.

In one embodiment, the decoder 24 protects the encapsulating computer file 16 from opening when the condition of one or more file protection parameter 18 is mismatched at steps 49, 51, and 53.

In one embodiment, the decoder 24 may delete, close, or lock the encapsulating computer file 16 at step 53 when the condition of one or more file protection parameter 18 is mismatched at step 49.

Figure 5:
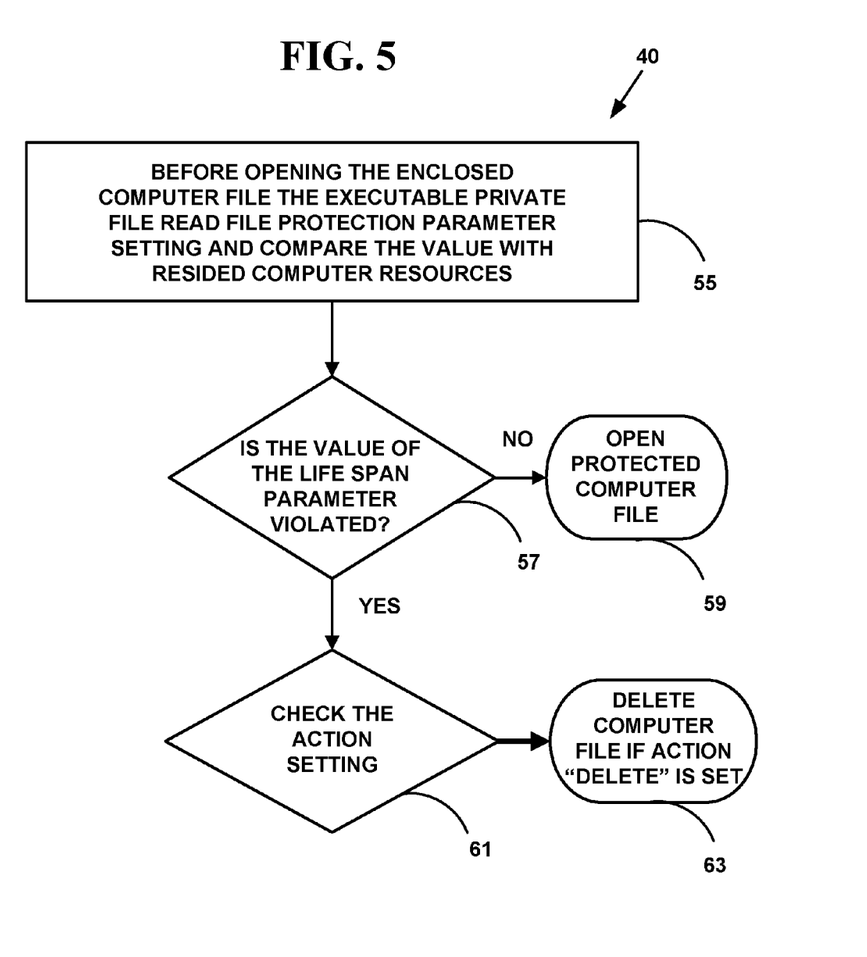
FIG. 5 is a flow diagram illustrating an exemplary computer file protection method.

FIG. 5 is a flow diagram 40 illustrating an exemplary file protection method. Before opening at step 59 the enclosed computer file 16 the decoder 24 reads at step 57 the file protection parameter settings 18 and compares at steps 57, 61 the value with resided computer resource 26. When the life span of the computer file 16 is reached at step 63 the decoder 24 takes the specified action 28 at step 63 on the computer file 16.

In one embodiment described in FIG. 5, the action 28 is set to "delete" the computer file 16.

Figure 6:
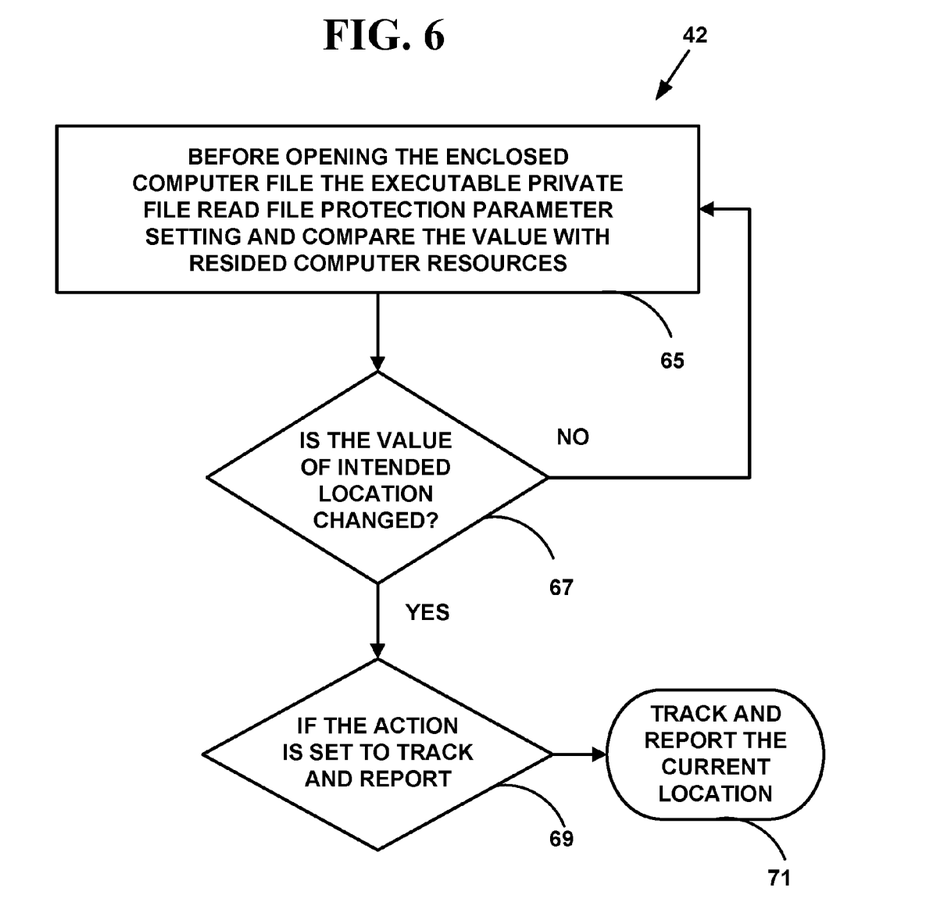
FIG. 6 is a flow diagram illustrating an exemplary file location tracking method.

FIG. 6 is a flow diagram 42 illustrating an exemplary file location tracking method. When the decoder 24 detects at steps 65, 67, 69 that the file intended location is changed it will use the computer resource 26 to track and report the current computer file location back at step 71 to file source shown in FIG. 3, the location of the network device where the computer file 16 was originated.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for secure and private computer file information protection, comprising:
  receiving a protection request on a file protection coder application in a non-statutory computer readable medium on a network device with one or more processors to protect a computer file on the network device;
  receiving on the file protection coder application a set of file protection parameters to protect the computer file including a file creation time, a file current source location, a file intended location and a file life span,
  wherein each file protection parameter includes one or more specific actions to complete when any of the set of file protection parameters is violated and
  wherein the one or more specific actions include, close file, lock file, delete file and track and report a new file location;
  receiving on the file protection coder application location information for the computer file,
  wherein the location information includes a current location of the computer file and an intended location for the computer file on a communications network;
  validating on the file protection code application with the received location information a current location or intended location for the computer file;
  sending from the file protection coder application to a file translator application the received file protection parameters and the validated received location information,
  wherein the file translator application inserts the received file protection parameters and the validated received location information into a private file data structure with a pre-determined layout, attaches the private file data structure to the computer file and compiles the computer file with the attached private data structure into a private executable and secure computer file,
  wherein the original file has been transformed into a private executable and secure computer file that is self-managing with the received file protection parameters and the validated received location information, and
  wherein the complied private executable and secure computer file includes a binary format comprising an object code or byte code format; and
  receiving on the file protection coder application from the file translator application the private executable and secure computer file, wherein the private executable and secure computer file is accessible on the network device via the communications network by other network devices.

2. The method for secure and private computer file in accordance with claim 1, wherein the network devices include: computers, notebooks, netbooks, pads, multimedia capable desktop and laptop computers, tablet computers, facsimile machines, mobile phones, non-mobile phones with and without displays, three-dimensional (3D) printer, robots, smart phones, Internet phones, Internet appliances, personal digital/data assistants (PDA), two-way pagers, digital cameras, portable game consoles, non-portable game, cable television (CATV) set-top boxes, satellite television (SATV) set-top boxes, Internet television set-top boxes, digital televisions including high definition television (HDTV), three-dimensional (3DTV) televisions, wearable devices for medical or non-medical usage, treadmills, exercise bicycles, remote controls and disposable network devices.

3. The method for secure and private computer file in accordance with claim 1, wherein the location information includes: an Internet Protocol (IP) address, a Media Access Control (MAC) address, a network device identifier, an alphabetic name, city, zip code, country code, or a numeric expression.

4. The method for secure and private computer file in accordance with claim 1, wherein the communications network includes, an Internet network, cellular network, a cloud computing network or a non-cloud computing network accessed via one or more wired or wireless communications interfaces on the network device.

5. The method for secure and private computer file in accordance with claim 1, wherein the private executable and secure computer file comprises an executable program that causes the one or more processors on the network device to execute instructions encoded included in the executable program.

6. The method for secure and private computer file in accordance with claim 1, further comprising:
receiving an access request on a file protection decoder application in the non-statutory computer readable medium on the network device to access the private executable and secure computer file on the network device;
executing from file protection decoder application the private executable and secure computer file;
determining on the file protection decoder application whether required resources on the network device are available to access the access the private executable and secure computer file on the network device, and if so,
determining on the file protection decoder application with the private file data structure attached to the computer file in the private executable and secure computer file on the network device, whether any of the file protection parameters have been violated, and if so,
completing on the file protection decoder application one or more of the specific actions included in the private file data structure attached to the computer file for any of the violated file protection parameters.

7. The method for secure and private computer file in accordance with claim 6, wherein wherein accessing the private executable and secure computer file on the network device includes opening or copying the private executable and secure computer file on the private network device.

8. The method for secure and private computer file of claim 6, wherein the required resources on the network device include a clock, a storage medium, an input and output device, and a network connection to the communications network.

9. The method for secure and private computer file of claim 6 further comprising:
determining on the file protection decoder application whether required resources on the network device are available to access the access the private executable and secure computer file on the network device, and if so,
determining on the file protection decoder application with the private file data structure attached to the computer file in the private executable and secure computer file on the network device, whether any of the file protection parameters have been violated, and if not,
allowing access from the file protection decoder application to the computer file in the private executable and secure computer file on the network device.

10. The method of for secure and private computer file of claim 9 wherein the step of allowing access including opening or copying the computer file in the private executable and secure computer file with the file protection decoder application on the network device.

11. The method for secure and private computer file of claim 6 further comprising:
determining on the file protection decoder application whether required resources on the network device are available to access the access the private executable and secure computer file on the network device, and if so,
determining on the file protection decoder application with the private file data structure attached to the computer file in the private executable and secure computer file on the network device, whether the file life span parameter has been exceeded, and if so,
deleting from the file protection decoder application on the network device the private executable and secure computer file including the computer file.

12. The method for secure and private computer file of claim 6 further comprising:
determining on a second file protection decoder application in a second non-statutory computer readable medium on a second network device with one or more processors whether required resources are available on the second network device to access the access the private executable and secure computer file on the network device, and if so,
determining on the second file protection decoder application with the private file data structure attached to the computer file in the private executable and secure computer file on the network device, whether the report a new file location file parameter has been changed, and if so,
sending a change of location message from second file protection decoder application on the second network device to the file protection decoder application on the network device via the communications network indicating that the private executable and secure computer file has been re-located to the second network device from the network device.

13. The method for secure and private computer file of claim 6 further comprising:
determining on the file protection decoder application, whether required resources on the network device are available to access the access the private executable and secure computer file on the network device, and if not,
denying allowing access from the file protection decoder application to the computer file in the private executable and secure computer file on the network device.

14. The method for secure and private computer file of claim 6 wherein the self-managing private executable and secure computer file includes a "read only" file that cannot be printed, copied, or edited during the execution of the private executable and secure computer file by the file protection decoder application on the network device.

15. The method for secure and private computer file of claim 6 further comprising the private executable and secure computer file including the file protection decoder application as a software function, software module or a software subroutine within the private executable and secure computer file.

16. The method for secure and private computer file of claim 1 wherein the computer file includes a text file, Portable Document Format (PDF) file, image file or mark-up language file.

17. The method for secure and private computer file of claim 1 wherein the private executable and secure computer file is self-manageable with the set of file protection parameters in the private file data structure attached to the original file in the private executable and secure computer file.

18. A system for secure and private computer file information protection, comprising in combination:
a file protection coder application in a non-statutory computer readable medium on a network device with one or more processors;
a file translator application in the non-statutory computer readable medium on the network device; and
a file protection decoder application in the non-statutory computer readable medium on the network device;
the file protection coder application, the file protection decoder application and the file protection decoder application including a plurality of instructions for causing the one or more processors on the network device to execute the steps of:
receiving a protection request on a file protection coder application in a non-statutory computer readable medium on a network device with one or more processors to protect a computer file on the network device;

receiving on the file protection coder application a set of file protection parameters to protect the computer file including a file creation time, a file current source location, a file intended location and a file life span, wherein each file protection parameter includes one or more specific actions to complete when any of the set of file protection parameters is violated and wherein the one or more specific actions include, close file, lock file, delete file and track and report a new file location;

receiving on the file protection coder application location information for the computer file, wherein the location information includes a current location of the computer file and an intended location for the computer file on a communications network;

validating on the file protection code application with the received location information a current location or intended location for the computer file;

sending from the file protection coder application to a file translator application the received file protection parameters and the validated received location information, wherein the file translator application inserts the received file protection parameters and the validated received location information into a private file data structure with a pre-determined layout, attaches the private file data structure to the computer file and compiles the computer file with the attached private data structure into a private executable and secure computer file, wherein the original file has been transformed into a private executable and secure computer file that is self-managing with the received file protection parameters and the validated received location information, and wherein the complied private executable and secure computer file includes a binary format comprising an object code or byte code format;

receiving on the file protection coder application from the file translator application the private executable and secure computer file, wherein the private executable and secure computer file is accessible on the network device via the communications network by other network devices;

receiving an access request on a file protection decoder application in the non-statutory computer readable medium on the network device to access the private executable and secure computer file on the network device;

executing from file protection decoder application the private executable and secure computer file; and determining on the file protection decoder application whether required resources on the network device are available to access the access the private executable and secure computer file on the network device, and if so, determining on the file protection decoder application with the private file data structure attached to the computer file in the private executable and secure computer file on the network device, whether any of the file protection parameters have been violated, and if so, completing from the file protection decoder application one or more of the specific actions included in the private file data structure attached to the computer file for any of the violated file protection parameters, and denying access from the file protection decoder application to the original file included the private executable and secure computer file on the network device, and if not, allowing access from the file protection decoder application to the original file included the private executable and secure computer file on the network device.

* * * * *